(12) United States Patent
Osmo (10) Patent No.: US 7,245,910 B2
(45) Date of Patent: Jul. 17, 2007

(54) METHOD AND SYSTEM FOR PROVIDING LOCATION DEPENDENT INFORMATION

(75) Inventor: Salo Osmo, Klaukkala (FI)

(73) Assignee: Nokia Corporation, Espoo (FI)

( * ) Notice: Subject to any disclaimer, the term of this patent is extended or adjusted under 35 U.S.C. 154(b) by 403 days.

(21) Appl. No.: 10/296,321

(22) PCT Filed: May 22, 2001

(86) PCT No.: PCT/IB01/01092

§ 371 (c)(1), (2), (4) Date: Apr. 9, 2003

(87) PCT Pub. No.: WO01/91411

PCT Pub. Date: Nov. 29, 2001

(65) Prior Publication Data

US 2003/0157942 A1    Aug. 21, 2003

(30) Foreign Application Priority Data

May 22, 2000    (GB)    ................... 0012354.7

(51) Int. Cl.
- *H04Q 7/20* (2006.01)
- *H04Q 7/22* (2006.01)
- *H04Q 7/38* (2006.01)
- *H04M 3/42* (2006.01)

(52) U.S. Cl. ............... 455/432.1; 455/414.1; 455/414.2; 455/414.3; 455/456.2; 455/456.3; 455/466

(58) Field of Classification Search .. 455/414.1–414.4, 455/456, 456.1–456.6, 457, 432.1–433, 466
See application file for complete search history.

(56) References Cited

U.S. PATENT DOCUMENTS

| | | | |
|---|---|---|---|
| 5,910,943 A | 6/1999 | Wickman | |
| 5,930,699 A * | 7/1999 | Bhatia | 455/456.3 |
| 5,949,775 A | 9/1999 | Rautiola | |
| 6,101,387 A * | 8/2000 | Granberg et al. | 455/456.1 |
| 6,269,244 B1 * | 7/2001 | Alperovich et al. | 455/433 |
| 6,356,761 B1 * | 3/2002 | Huttunen et al. | 455/456.1 |
| 6,677,894 B2 * | 1/2004 | Sheynblat et al. | 455/456.3 |
| 6,850,766 B2 * | 2/2005 | Lau et al. | 455/456.1 |
| 6,922,562 B2 * | 7/2005 | Ward et al. | 455/432.1 |
| 7,062,265 B1 * | 6/2006 | Chang et al. | 455/426.1 |
| 7,072,665 B1 * | 7/2006 | Blumberg et al. | 455/414.1 |
| 2001/0044310 A1 * | 11/2001 | Lincke | 455/456 |
| 2002/0132623 A1 * | 9/2002 | Kingdon | 455/456 |
| 2002/0168986 A1 * | 11/2002 | Lau et al. | 455/456 |

FOREIGN PATENT DOCUMENTS

| | | |
|---|---|---|
| WO | WO 96/36193 | 11/1996 |
| WO | WO 98/57506 | 12/1998 |

(Continued)

*Primary Examiner*—Charles Appiah
*Assistant Examiner*—Olivia Marsh
(74) *Attorney, Agent, or Firm*—Squire, Sanders & Dempsey L.L.P.

(57) ABSTRACT

A method of providing location dependent information in a communications system, said method comprising the steps of: providing information identifying the location of a first station; sending said location information to a first element, said first element determining a second element based on said location information; and said second element providing geographic information relating to said location information.

34 Claims, 4 Drawing Sheets

FOREIGN PATENT DOCUMENTS

| WO | WO 99/04582 | 1/1999 |
|----|-------------|--------|
| WO | WO 99/09760 | 2/1999 |
| WO | WO 99/12378 | 3/1999 |
| WO | WO 99/41927 | 8/1999 |
| WO | WO 99/45732 | 9/1999 |
| WO | WO 00/22794 | 4/2000 |

* cited by examiner

METHOD AND SYSTEM FOR PROVIDING LOCATION DEPENDENT INFORMATION

FIELD OF THE INVENTION

The present invention relates to a method and system for providing location dependent information, and in particular but not exclusively when a wireless terminal is no longer in its home network.

BACKGROUND OF THE INVENTION

The area covered by a cellular telecommunications network is divided into a plurality of cells. Each cell is served by a base transceiver station. Mobile stations are arranged to communicate with the base transceiver station of the cell with which the mobile station is associated. The communications between the base station and the mobile station is by means of a wireless connection.

It has been proposed that the cellular network be used in order to determine the location of a mobile station and hence the user thereof. In particular, the cell in which the mobile station is located can be identified and hence an estimate of the position of the mobile station and its user can be obtained.

Using this information, it has been proposed that location dependent services or information can be provided to a user. For example, a user may need to find the nearest ATM (automatic teller machine). Banks often operate in an international environment, i.e. the same services are available in many countries. The service provider (in this case the Bank) may have information about ATM's and their locations for example for the whole Scandinavian area. The location service may be a WAP (wireless application protocol) service.

Problems arise when a mobile station roams in a different network. This different network is referred to as the visited network. A subscriber generally subscribes to one network, the home network, but can use his mobile station in areas not covered by his home network. This is permitted where agreements exist between the home network and the visited network. The home and visited network are often operated by different network operators. Where cell information is provided by the mobile station, this information has to be converted to a more usable format, such as geographical coordinates, country or city name, postal address etc before it can be used by the WAP location dependent service. This is because the WAP location service is not able to associate the cell identity with a geographical location. Usually, the conversion of the cell identity into geographic information can be made by using cell information maintained by a network operator. This information is usually confidential or is difficult for anyone except the operator to keep up to date. Accordingly, one operator may not have information about another operator's cells and the associated geographic information. In other words, when the mobile station is visiting another network, it may not be possible to provide geographic information associated with a cell identity. Without this geographic information, it is not possible to provide a location dependent service. In the case of the example discussed previously, when for example, a Finnish person requests the service in Stockholm, the home operator cannot convert the cell identity of the Finnish person into geographical information because the cell identity values are from another operator's network. The Finnish person can therefore not receive information on the location of the nearest ATM.

SUMMARY OF THE INVENTION

It is an aim of an embodiment of the present invention to address the above problem.

According to a first aspect of the present invention, there is provided a method of providing location dependent information in a communications system, said method comprising the steps of:

providing information identifying the location of a first station;

sending said location information to a first element, said first element determining a second element based on said location information; and said second element providing geographic information relating to said location information.

According to a second aspect of the present invention, there is provided a communications system comprising:

a first station, information on the location of said first station being available;

a first element, arranged to receive said location information and to determine a second element based on said location information; and said second element arranged to provide geographic information relating to said location information.

According to a third aspect, there is provided a gateway element for use in a communication system, said gateway element being arranged to receive location information from a first station, said location information being defined with respect to said system, said gateway element being arranged to forward said location information to a first element which is arranged to provided geographical information associated with said location information, said gateway element being arranged to receive said geographical information from said first element and to forward said geographical information to a further element which provides location dependent information associated with said geographical information, said gateway element being arranged to receive said location dependent information from said further element and to forward said information to said first station.

According to a fourth aspect of the present invention, there is provided a network element for use in a communications system comprising:

means for storing geographic information relating to the network of which said element is a part;

means for receiving location information relating to the position of a first station in said network;

means for determining if said network is the home network of said first station;

means for forwarding said location information to a corresponding network element of a different network if said different network is the home network of said station; and     means for outputting geographic information corresponding to said location network from either said storing means if said network is the home network or from said corresponding network element if said home network is said different network.

According a further aspect, there is provided a method of providing location dependent information to a first station in a communications system, said method comprising the steps of:

providing information identifying the location of a first station, said information being defined with respect to said system;

sending said location information to a first element, said first element being arranged to provided geographical information relating to said location information; and sending said geographical information to a further element, said further element being arranged to provide information associated with said geographical information to said first station.

According to a further aspect, there is provided a communication system comprising:

a first station, said first station being arranged to provide information identifying the location of a first station;

a first element, said first element being arranged to provided geographical information relating to said location information; and a further element, said further element being arranged to provided information associated with said geographical information to said first station.

BRIEF DESCRIPTION OF THE DRAWINGS

For a better understanding of the present invention, reference will now be made by way of example to the accompanying drawings in which.

DETAILED DESCRIPTION OF EMBODIMENTS OF THE INVENTION

Figure 1:
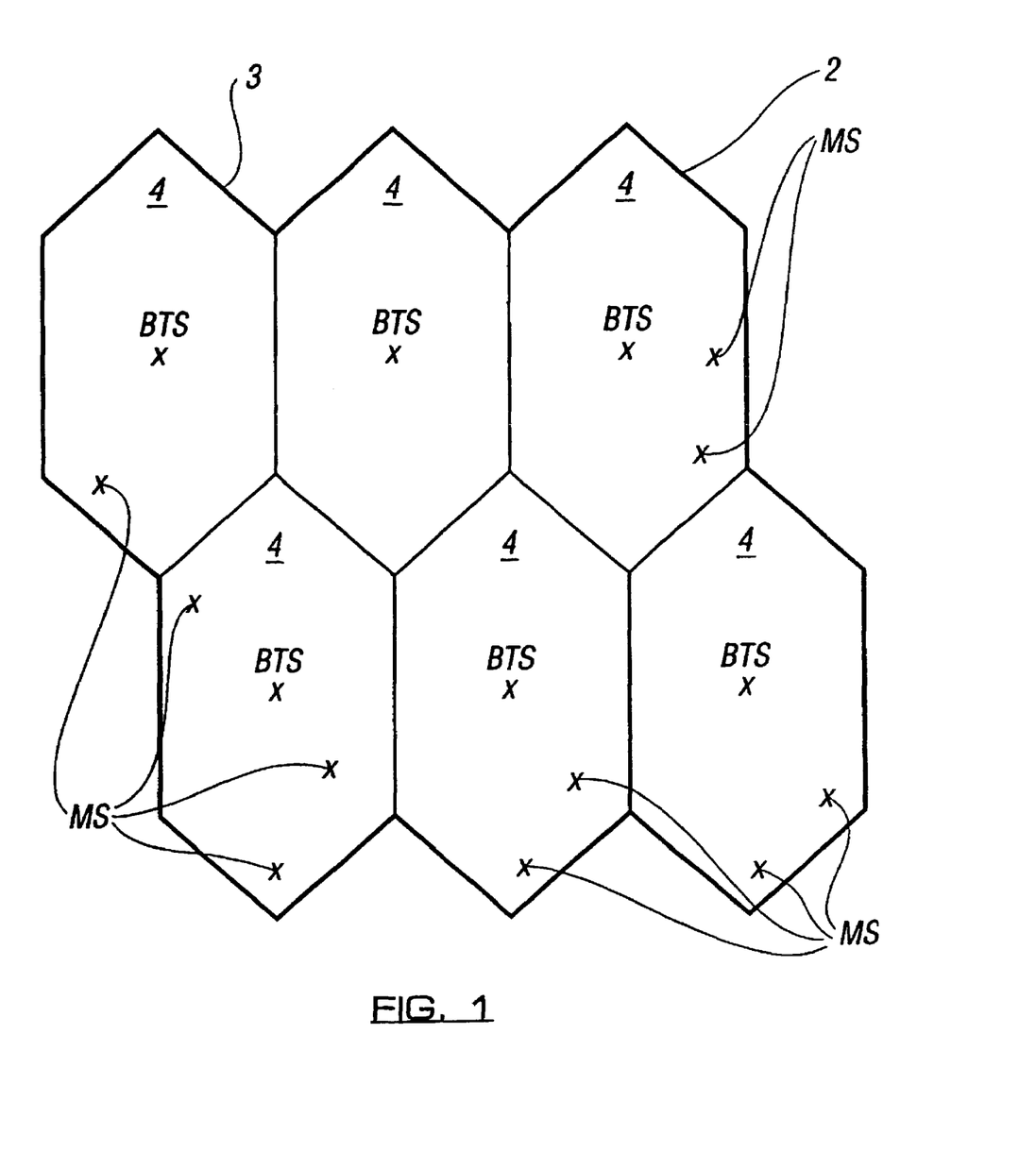
FIG. 1 shows a schematic diagram of a cellular telecommunications system in which embodiments of the present invention can be used.

FIG. 1 shows a home wireless cellular network 2 and a visited wireless cellular network 3. The area covered by the each network is divided into a plurality of cells. The home and visited networks are shown as being non overlapping. It is possible that the networks partially or completely overlap. Embodiments of the present invention are relevant to both overlapping and non-overlapping networks. The networks shown in FIG. 1 are each provided with three cells. It should be appreciated that this is for illustrative purposes only and in practice each network will have many more cells. The cells can take any suitable format and may for example be in the form of cell sectors or the like. Each cell 4 is served by a respective base transceiver station BTS. Each base transceiver station BTS is arranged to send radio signals to and receive signals from terminals MS in the cell 4 associated with the respective base transceiver station.

Figure 2:
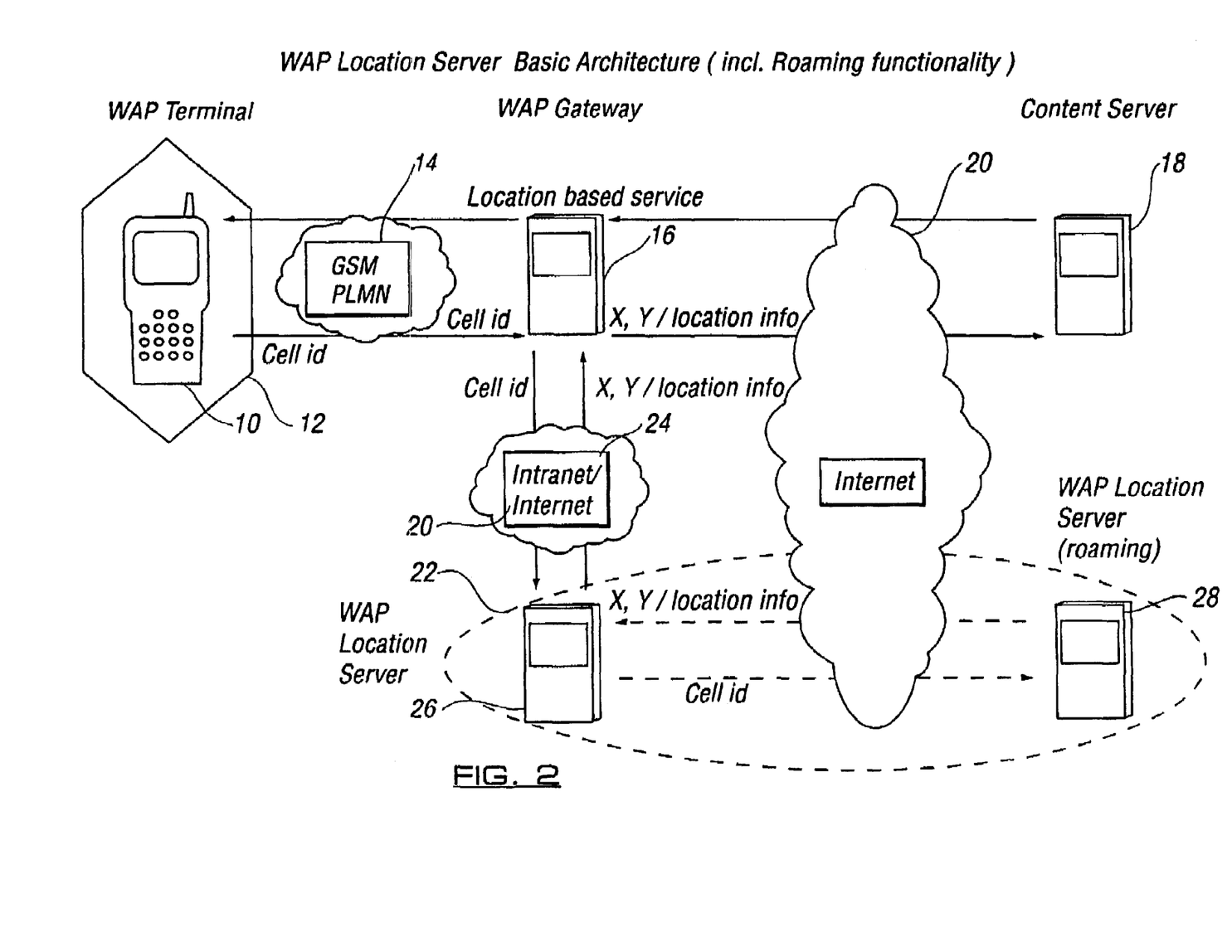
FIG. 2 shows a block diagram of a system embodying the present invention.

Reference is made to FIG. 2, which shows the system embodying the present invention. The mobile station 10 is located in a cell 12. The mobile station 10 is arranged to communicate with a base transceiver station (not shown) associated with the cell 12. The base transceiver station is arranged to communicate with other elements of a GSM public land mobile network (PLMN) 14. GSM is the global system for mobile communications standard which uses a frequency/time division multiple access technique. The GSM standard specifies the various network elements that are required and/or can be provided and how those elements should operate. The base station and the mobile station are part of the GSM network.

In the embodiment described, the mobile station is a WAP (wireless application protocol) device. This means that the mobile station is able to provide WAP services. The wireless application protocol is defined in a standard defined by the WAP forum which is an international organisation. The WAP services allow the user to receive and transmit more data and permit Internet services to be supported.

A wireless application protocol (WAP) gateway 16 is provided. This gateway provides a gateway between the GSM network 14 and a content server 18 which provides information dependent on the location of the mobile station 10. Communication between the WAP gateway 16 and the content server 18 is via the Internet 20. The WAP gateway 16 allows WAP messages to be transmitted to the Internet and vice versa. The WAP gateway takes care of the protocol translation.

The WAP gateway 16 is also in communication with a WAP home location server 26. Communication between the WAP gateway 16 and the WAP home location server 26 is via the Internet 20 or an intranet 24.

The home location server 26 is provided for the home network which converts the cell identity information into geographical coordinates. A separate roaming location server 28 is provided for each of the other networks in which the terminal is permitted to roam or visit. Again, each roaming server 28 will store information which converts cell identity information into geographic coordinates. It should be appreciated that the home location server 26 and the roaming location servers 28 communicate via the Internet 20. The roaming location servers are home location servers for their own networks. Likewise, the home location server is a roaming location server to the roaming location servers. If the user is roaming in a visited network, and is using WAP services via the home network operator's WAP gateway the location request must be routed to the visiting network operator's own location server 28. This is done via the home operator's home location server 28. So, each WAP gateway has a link only to the "home" location server 26 and the home location server 26 itself takes care of forwarding the query if needed to the roaming location server 28. The roaming location server 28 itself can receive location (or conversion) requests from many different sources for example: from the home networks WAP gateway; from the other operator's location server (in the case that some other operator's subscriber is roaming in the home network); from the content server; and/or from some other system. The location servers are generally part of the serving operators normal system.

The home location server may be integrated in the WAP gateway. In this case the WAP gateway will send requests to the WAP gateways of the visited network in order to obtain the required geographic information. Alternatively the requests can be sent to separate location servers, depending on the architecture of the system.

Before describing the signalling in detail, the function of the arrangement shown in FIG. 2 will be briefly described. The mobile station requests a location service. The request is forwarded to the content server 18 via the WAP gateway 16. The content server 18 sends a location request back to the mobile station, again via the WAP gateway 16. The mobile station sends information identifying the cell 12 in which it is currently located to the GSM network along information identifying the network in which the mobile station is located. In particular cell identity is sent. The cell identity in GSM comprises four parts:

MCC; Mobile Country Code which identifies the country;

MNC; Mobile Network Code which identifies the network (operator);

LAC—Location Area Code which identifies a larger part of operator's network, typically an area of one or several switches; and Cell-id—Cell Identification which identifies a single cell The GSM network 14 forwards the cell identity to the WAP gateway 16. The WAP gateway 16 forwards the cell identity to the WAP location server 22 via the Internet 20 or Intranet 24. The home location server 26 checks cell identity provided by the mobile station to see whether or not the mobile station is currently located in the home network. This can be determined from the MCC and MNC part of the cell identity string. If the mobile station is located in the home network, the home location server 26 determines the geographic information associated with the cell identity and sends it back to the WAP gateway 16 via the Internet 20 or intranet 24.

If the home location server 26 determines that the mobile station is not in the home network, it determines from the network identity the network in which the mobile station is located. Again, this can be determined from the MCC and MNC. Once the home location server 26 has determined the network in which the mobile station is located, the cell identity is forwarded to the location server 28 of that operator. The operator of the network concerned provides the geographic information associated with the cell identity and sends it back to the home location server 26. The geographic information either from the roaming location server 28 or the home location server 26 is forwarded via the intranet 24 or Internet 20 to the WAP gateway 16. The WAP gateway 16 forwards the geographic location information to the content server 18 along with an indication as to the type of information requested.

The WAP gateway 16 receives the WAP message from the mobile station. If the WAP gateway 16 determines that the message contains location parameters, the gateway 16 creates a location request and sends it to the location server. The WAP gateway 16 will hold the WAP message or at least part of it until an answer is received from the location server. The WAP gateway replaces the original location information (cell identity) with the geographic information and forwards the revised message to the content server.

Based on the geographic information received by the content server 18, the content server 18 is able to return the required location dependent information to the WAP gateway 16. The WAP gateway 16 then forwards the location dependent information to the GSM network 14 which in turn forwards the required information to the mobile station 10.

Figure 3A:
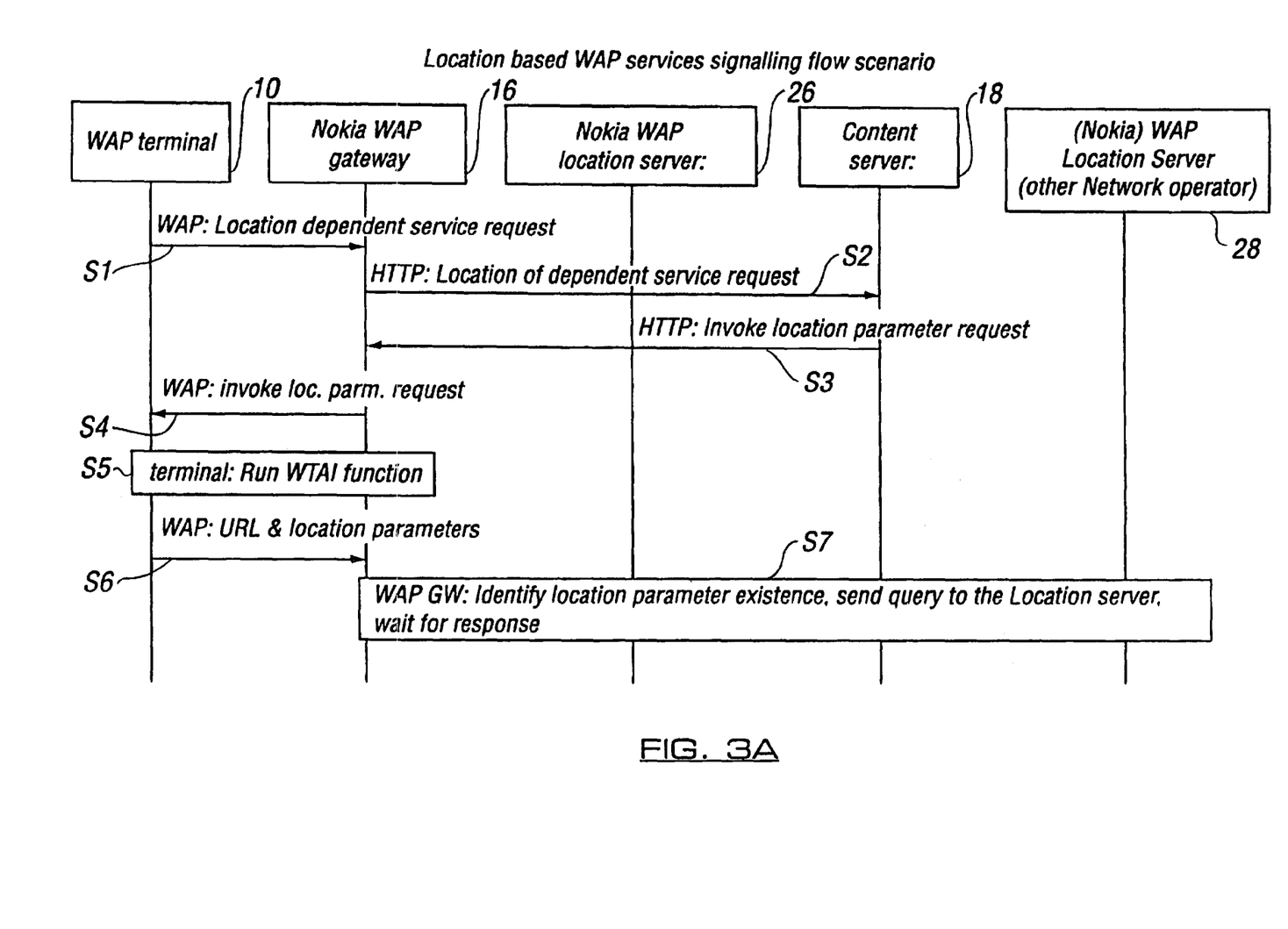
FIG. 3 shows the signal flow in the arrangement shown in FIG. 2.
Figure 3B:
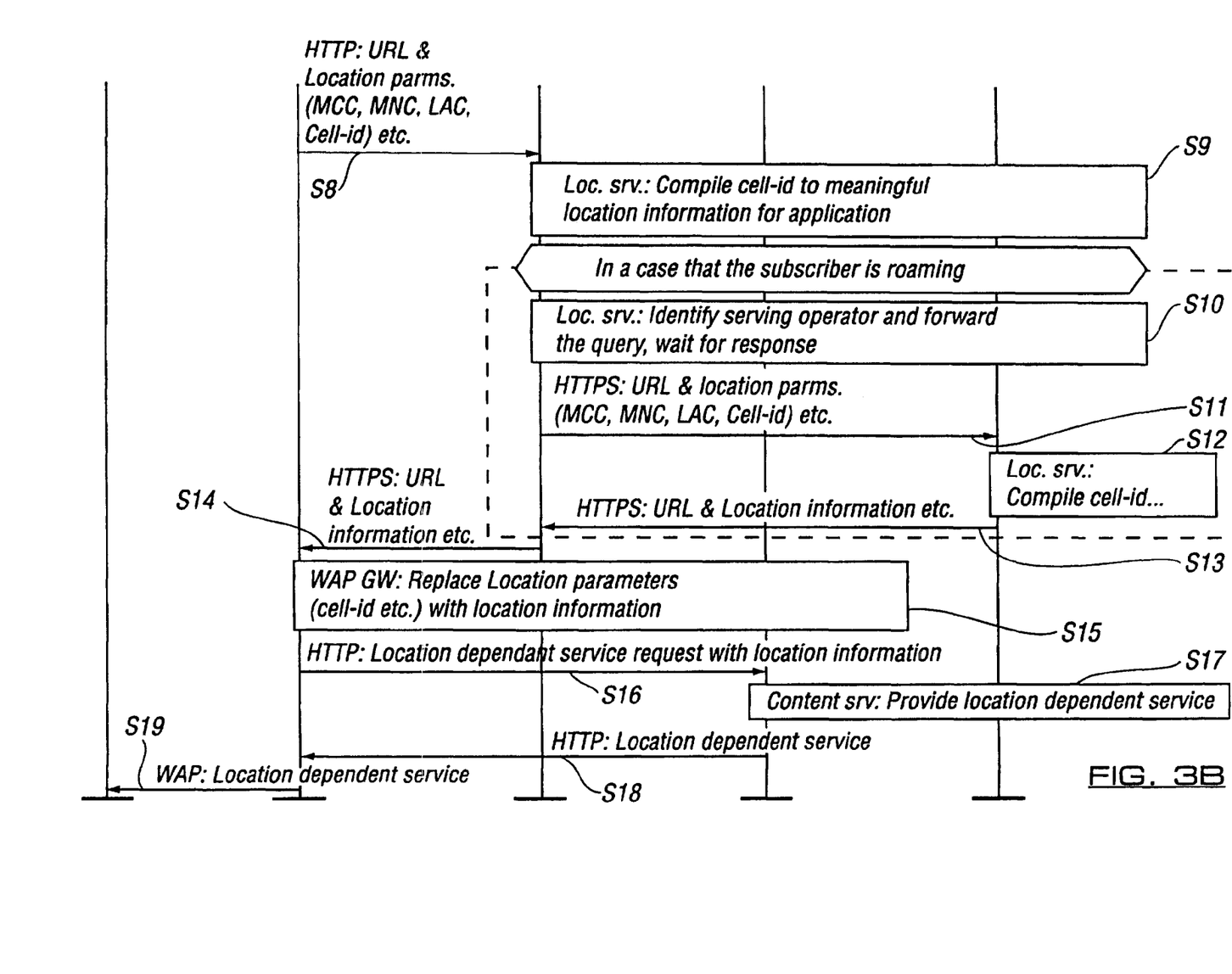

Reference will now be made to FIG. 3 which shows the signalling flow which takes place in the arrangement shown in FIG. 2. Initially, the mobile station 10 sends a message requesting a service. This service may be a location dependent service and the request may indicate the type of location service request. The message is in accordance with the WAP protocol. This message is forwarded through the GSM network 14 to the WAP gateway 16. This takes place in step S1.

In step S2, the WAP gateway 16 may translate the message into an HTTP (Hypertext transport protocol message and sends the location dependent service request message to the content server 18. In the WAP API method, calls are sent to the WAP mobile station which executes the WTA functions in order to get the location parameters from the mobile station's registers and send them with WAP message to the WAP gateway. The WAP gateway 16 may store the request along with information identifying the mobile station making the request.

The content server 18, in response to the request sends a message in step S3 to the WAP gateway 16 invoking a location parameter request. This request asks the mobile station for information on its location. This message is embedded in the HTTP form of message.

This request translated by the WAP gateway from a HTTP message to a WAP message and then forwarded by the WAP gateway 16 to the mobile station in step S4.

In step S5, the mobile station takes the necessary steps in order to determine the location of the mobile station. In particular WTA//WTAI (Wireless telephony application specification and wireless telephony application interface specification) functionality is invoked in the mobile station. This is invoked by the location parameter request from the content server. The WTA/WTAI function reads the location parameters such as the MCC, MNC, LAC and cell identity of the serving cell from the mobile station's register. The information may alternatively or additionally be available from the base station. It should be appreciated that the location parameters referred to above are only part of the location parameter defined by WTA and WTAI. The additional location parameters may be used in embodiments of the present invention.

WTAI is an applications programming interface which enables the WAP content within the mobile station to request services from the mobile equipment infrastructure, that is not just the WAP browser or execution environment but the rest of the native mobile equipment software. For example the WTAI may contain a service which enables the WAP content to ask the location of the mobile station. The mobile station returns to the WAP content the location, for example the cell identification.

There are several possible embodiments for the implementation of the location enquiry from the mobile station. For instance the message received by the mobile station may be a message that is received and interpreted by a WAP content residing in the mobile station WAP browser. The WAP content doing the message interpretation may have been downloaded to the mobile station during the request for the location service from the content server.

Alternatively, the location parameter request message sent at step S3 may include a WAP content. This WAP content may actually be the first content sent as the response from the content server to the message requesting the location service sent at step S2.

The WAP content further contains, for example, a WAP WML code or WML script comprising instruction for the WAP browser to request the location of the mobile station. This instruction may be WTAI method call. The response containing for example, a cell identification is returned from the mobile station to the WAP browser in the mobile station. The WAP content then generates the response message for step S6 and includes the cell identification to it.

The response message sent at step S6 may for example comprise a request for the location specific part of the content provided from the content server. The content at the content server may comprise a location independent part and a location dependent part. For example, the first response comprising the location request may also carry a location independent part such as a welcome message or a page heading. After that, for the rest of the content the location information is needed.

Alternatively, the location enquiry message may itself comprise a WAP content that is executed by the mobile station as soon as it is received by the mobile station. The WAP content may be pushed to the mobile station using the standard WAP push mechanism or it may be pushed to the mobile station using the WTA service indication mechanism.

The location may alternatively be interpreted by the mobile station without using the WAP browser.

The WAP content then performs the WTAI API location request to the mobile station and the mobile station replies to it. From the reply, the WAP content sends the reply message towards the WAP gateway.

The mobile station sends a WAP protocol message to the WAP gateway 16 indicating the universal resource locator (URL) and location parameters. The location parameters are those obtained in step 5. The location parameters take the form described previously. The universal resource locator is an Internet address. It is used in the signalling flow scenario to express how and where the location parameters are transmitted from the WAP gateway. This takes place in step S6.

In some embodiments of the present invention steps 2 to 5 may be omitted. For example in step 1, when the original service request is activated, the WTA/WTAI functionality of the mobile station can be invoked to jump directly to step 6.

In step S7, the WAP gateway 16 identifies the existence of the location parameters. In step S8, the WAP gateway 16 is arranged to send an HTTP message to the location server 22 including the location parameters.

The home location server 26 in step 9 identifies if the mobile station is in its home network or another network. In particular the home location server 26 checks the network identity. If the mobile station is in its home network, then the home location server 26 provides geographical location information corresponding to the cell identity.

If the home location server 26 determines from the network identity that the subscriber is roaming, the home location server 26 identifies which operator serves the network in which the mobile station is located. This takes place in step S10. In step S11, the home location server forwards the query. In particular, the home location server 26 sends an HTTP message to the roaming location server 28 including the location parameters.

In step S12, the roaming location server 28 identifies the geographical information corresponding to the cell identity. In step 13, the roaming location server 28 sends an HTTP message to the home location server 26 including the geographic location. In other words, the home location server 26 will either have access directly to the geographic location if the mobile station is located in the home network or will receive the geographic location from the location server serving the network in which the mobile station is located.

In step S14, the home location server 26 sends a HTTP message including the geographic location, to the WAP gateway 16. In step S15, the WAP gateway replaces the cell identity with the location information. In step S16, the WAP gateway 16 sends an HTTP message to the content server 18 which includes the location dependent service request from the mobile station with the location information.

In stage S17, the content server determines the information which is required in dependence on the geographic location provided. In step S18, the content server 18 sends an HTTP message to the WAP gateway 16 including the requested location dependent information.

The WAP gateway 16 converts the message into a WAP message and forwards the location dependent information to the mobile station 10 in stage S19.

In the preferred embodiment of the present invention, reference has been made to the mobile station determining the identity of the cell in which the mobile station is located. In alternative embodiments of the present invention, the mobile station may be arranged instead to locate the service area in which it is located. A service area comprises two or more cells. The location information provided by the service area will not be as accurate as that obtained from the cell identity but nevertheless may be sufficiently accurate for the required purpose. The service area of a group of cells may be identified by a location area code (LAC). It is of course possible to use any other appropriate location indicator which may be representative of one or more cells. In some embodiments of the invention, the cell identity is a hierarchical data item. Accordingly part of the information may be enough for some services (for example MCC for identifying which currency is valid in the current location. The mobile station may provide all of the parameters and which of those parameters which are used is up to the service.

In one modification to the present invention, the WAP gateway determines which of said home and roaming location server is able to provide the required information and to forward the location information directly to the location server. In other words the location information is not directed to the roaming location server via the home location server. This alternative function may be controlled by any other suitable network element instead of by the WAP gateway. In a further modification, the WAP gateway obtains information as to the location server which is relevant to the current position of the mobile station. Based on this information, the WAP gateway sends the information directly to the home location server or the respective location server as the case may be.

More sophisticated methods may be used to determine the location of the mobile station. For example, using two or more base stations, a more accurate determination of the position of a mobile station can be made. However, that information will be defined in terms of, for example, distance and direction from two or more base stations. This information in its own right does not provide geographical location information and would need to be translated into a suitable format for the content server. This again can be achieved by using the location server arrangement 22. A processor may be required in order to extract the necessary information and to determine the actual geographic position of the mobile station.

The geographic position information provided by the WAP location server 22 can take any suitable format. For example, the geographic information can take the form of any one or more of the following: geographic coordinates; country/city names; addresses; post codes or the like. The geographic information can take any suitable format which can be used by the content server.

The location information requested by the content server may already be in geographical format. This location servers may assist in translating for example coordinate information into a textual location description such as street addresses or location names.

For example, the content server could ask the location of the mobile station from a specific location server such as a GMLC (gateway mobile location server) from which the geographic location of a mobile station can be enquired using for example the MSISDN number of the mobile station. The geographic information of the mobile station can then be provided by the content server to the home location server which in this case also determines whether it can reply to the location request or whether it forwards the query to a roaming location server. The decision could be based on approximate information on network boundary coordinates for at least one network.

There are many examples of location services which can be requested by the user. For example, the user can request yellow page type information such as the closest restaurants, taxi service or the like. Alternatively, the location information can be used to provide information such as time table information relevant to the current location of the user or film times for a local cinema.

In the preferred embodiment of the present invention, the mobile station is described as making a request for a location dependent service. In some embodiments of the present invention, the mobile station may, in certain situations, be automatically provided with location dependent information. This might be advertising information or the user could request that he is provided with certain information when he is in a given location. In that case, the mobile station would not make the initial request but this may be generated by another network element, for example an element in the GSM network. Alternatively, this can be generated by the content server or a separate network element.

In the preferred embodiments of the invention, various of the connections have been described as being provided by the Internet. The connection may be a secured or unsecured connection. In alternative embodiments of the invention, one or more of these connections may be replaced by any other suitable communications link. It should be appreciated that any of the communication links between any of the elements may be placed by any other suitable link.

Embodiments of the present invention have been described in the context of a GSM system. However, it should be appreciated that embodiments of the present invention can be implemented in any other suitable standard. For example, embodiments of the present invention can be implemented in a code division multiple access system or any other suitable system.

The mobile station has been described as using the wireless application protocol and the gateway described as being a wireless application protocol gateway. However, this is by way of example and any other suitable protocol can be used by the mobile station and the gateway. For example, the location services provided may be a SMS (short message service) type of message.

In SMS (short message service), the message is sent using the signalling channel usually from a SMS capable mobile station via a SMS centre to another mobile station. However the message can also be sent from the mobile station to the content server via the SMS centre and vice versa. This uses a similar signalling flow to the WAP based service except the WAP capable mobile station is replaced by a SMS capable mobile station and the SMS centre takes the place of the WAP gateway. The SMS centre has the additional functionality which recognises the cell identity parameters from the SMS message, sends them to the location server, waits for the reply from the location server and then replaces the cell identity parameters with the geographic location information provided by the location server and finally sends the modified SMS message to the content server. As with the WAP system, the content server is able to provide a location based service message via the SMS centre, in the form of a SMS message.

The location parameters can be sent by the mobile station in the visible part of the message, as an extension of the original message or as a separate message. In the last case, the first message contains the location dependent service request and the second message contains the location parameters. In the first two cases, the location parameters may be in the same message as the location dependent service request.

In embodiments of the invention, the same home location server and roaming location servers may be able to support SMS and WAP services as well as any other suitable service.

The invention claimed is:

1. A method comprising:
providing network location information identifying a location of a first mobile station;
sending said network location information to a first network element, said first network element forwarding said network information to a second network element in a communications system;
determining, by said second network element, whether said network location information relates to the home network of said first mobile station, and forwarding said network location information to a corresponding network element of a different network when said network location information relates to said different network; and
providing, by said second network element, location dependent information comprising geographic information relating to said network location information from said second network element when said network location information relates to the home network and from said corresponding network element when said network location information relates to said different network.

2. The method as claimed in claim 1, further comprising:
passing said geographic information to a further network element, said further network element being configured to provide information associated with said geographic information to said first mobile station.

3. The method as claimed in claim 2, further comprising:
passing messages between the first mobile station and the second network element and/or the further network element using said first network element configured to be a gateway element.

4. The method as claimed in claim 3, further comprising:
passing messages between the further network element and the second network element through said gateway.

5. The method as claimed in claim 3, further comprising:
translating, by said gateway, the message between a first and second format.

6. The method as claimed in claim 3, further comprising:
storing, by said gateway, information defining the type of location information required while the second network element provides the geographic information.

7. The method as claimed in claim 6, further comprising:
sending, by said gateway, the geographic information and the information defining the type of location information required to the further network element.

8. The method as claimed in claim 1, further comprising:
configuring the communications system to include at least one communications network.

9. The method as claimed in claim 7, further comprising:
dividing said at least one communications network into a plurality of cells.

10. The method as claimed in claim 8, wherein the sending said network location information comprises sending the identity of the cell in which the first mobile station is located.

11. The method as claimed in claim 8, wherein the sending said network location information comprises sending the identity of a group of cells in which the first mobile station is located.

12. The method as claimed in claim 7, further comprising:
configuring said communications system to include a home network with which the first mobile station is associated and at least one other network that can be visited by the first mobile station.

13. The method as claimed in claim 12, wherein the sending said network location information comprises sending the identity of the network.

14. The method as claimed in claim 12, further comprising:
providing a second network element for each network.

15. The method as claimed in claim 14, further comprising:
configuring the second network elements to communicate via the Internet.

16. The method as claimed in claim 2, further comprising:
configuring at least one of the second network element and the further network element to communicate with the first network element via the Internet.

17. The method as claimed in claim 2, further comprising:
requesting, by said first mobile station, location dependent information from said further network element.

18. The method as claimed in claim 17, wherein the requesting comprises requesting said network location information from said first mobile station in response to a request for location dependent information from the first mobile station.

19. The method as claimed in claim 1, further comprising:
arranging said first mobile station to provide address information in association with said network location information so that the first mobile station receives the location dependent information.

20. The method as claimed in claim 1, further comprising:
operating said first mobile station in accordance with a wireless application protocol.

21. The method as claimed in claim 1, wherein said providing said geographic information comprises providing at least one of geographic coordinates, an address, a post code, the town, or the country.

22. The method as claimed in claim 1, wherein the sending said network location information comprises sending information identifying the network in which the mobile station is located.

23. A method as claimed in claim 1, wherein the sending said network location information comprises sending information identifying the country in which the mobile station is located.

24. A communication system, comprising:
a first mobile station, network location information on a location of said first mobile station being available;
a first network element, configured to receive said network location information and to forward said network information to a second network element; and
said second network element configured to determine when said network location information relates to a home network of said first mobile station, and forward said network location information to a corresponding network element of a different network when said network location information relates to said different network, said second network element being further configured to provide geographic information relating to said network location information from said second network element when said network location information relates to the home network and from said corresponding network element when said network location information relates to said different network.

25. The communication system as claimed in claim 24, wherein said network location information is defined with respect to said system,
wherein said first network element is configured to receive said geographic information from said second network element and to forward said geographic information to a third network element that provides location dependent information associated with said geographic information, and
wherein said first network element is configured to receive said location dependent information from said third network element and to forward said location dependent information to said first mobile station.

26. The communication system as claimed in claim 24, said second network element comprising:
means for storing geographic information relating to a network of which said second network element is a part;
means for receiving said network location information relating to the position of said first mobile station in said system;
means for determining whether said network location information relates to the home network of said first mobile station or a different network;
means for forwarding said network location information to a corresponding network element in a different network when said network location information relates to said different network; and
means for outputting geographic information corresponding to said network location network from said storing means when said network location information relates to the home network and from said corresponding network element when said network location information relates to said different network.

27. A gateway element configured to be used in a communication system, wherein said gateway element is configured to receive network location information from a first mobile station, wherein said location information is defined with respect to said system, wherein said gateway element is configured to forward said network location information to a first network element that is configured to determine whether said network location information relates to the home network of said first mobile station, and forward said network location information to a corresponding network element of a different network when said network location information relates to said different network, wherein said first network element is further configured to provide geographic information associated with said network location information from said first network element when said network location information relates to the home network and from said corresponding network element when said network location information relates to said different network, wherein said gateway element is configured to receive said geographic information from said first network element and to forward said geographic information to a further network element that is configured to provide location dependent information associated with said geographic information, and wherein said gateway element is configured to receive said location dependent information from said further network element and to forward said information to said first mobile station.

28. A gateway element as claimed in claim 27, wherein said gateway element is configured to translate information between first and second formats.

29. A network element, comprising:
means for storing geographic information relating to a network of a communications system of which said network element is a part;
means for receiving network location information relating to a position of a first mobile station in said system;
means for determining whether said network location information relates to a home network of said first mobile station;

means for forwarding said network location information to a corresponding network element of a different network when said network location information relates to said different network; and means for outputting geographic information corresponding to said network location information from said storing means when said network location information relates to the home network and from said corresponding network element when said network location information relates said different network.

30. A method, comprising:

providing network location information identifying a location of a first mobile station in a communications system, said information being defined with respect to said communications system;

sending said network location information to a first network element, said first network element being configured to determine when said network location information relates to a home network of said first mobile station, and forward said network location information to a corresponding network element of a different network when said network location information relates to said different network, said first network element being further configured to provide geographic information relating to said network location information from said first network element when said network location information relates to the home network and from said corresponding network element when said network location information relates to said different network; and sending said geographic information to a further network element, said further network element being configured to provide location dependent information associated with said geographic information to said first mobile station.

31. A method, comprising:

providing network information identifying a location of a first mobile station;

sending said network location information to a first network element in a communications system;

determining, by said first network element, whether said first network element is able to provide geographic information associated with said network location information; and sending said network location information to a further network element, when it is determined that said first network element is unable to provide said geographic information, said further network element being configured to provide said geographic information to said first mobile station.

32. A communication system, comprising:

a first mobile station, said first mobile station being configured to provide network location information identifying a location of said first mobile station;

a first network element, said first network element being configured to determine when said network location information relates to the home network of said first mobile station, and forward said network location information to a corresponding network element of a different network when said network location information relates to said different network, said first network element being further configured to provide geographic information relating to said network location information provided by said first mobile station from said first network element when said network location information relates to the home network and from said corresponding network element when said network location information relates to said different network; and a further network element, said further element being configured to provide location dependent information associated with said geographic information provided by said first network element to said first mobile station.

33. A method, comprising:

storing, at a network element, geographic information relating to a network of a communications system of which said network element is a part;

receiving network location information relating to the position of a first mobile station in said system;

determining whether said network location information relates to a home network of said first mobile station;

forwarding said network location information to a corresponding network element of a different network when said network location information relates to said different network; and outputting geographic information corresponding to said network location information from the network element when said network location information relates to the home network and from said corresponding network element when said network location information relates said different network.

34. A network element, comprising:

a memory configured to store geographic information relating to a network of a communications system of which said network element is a part;

a receiving unit configured to receive network location information relating to the position of a first mobile station in said system;

a determination unit configured to determine whether said network location information relates to a home network of said first mobile station;

a forwarding unit configured to forward said network location information to a corresponding network element of a different network when said network location information relates to said different network; and an output unit configured to output geographic information corresponding to said network location information from said memory when said network location information relates to the home network and from said corresponding network element when said network location information relates said different network.

* * * * *